(12) United States Patent
Otto et al.

(10) Patent No.: US 9,182,011 B2
(45) Date of Patent: Nov. 10, 2015

(54) FAN DRIVE GEAR SYSTEM FLEXIBLE SUPPORT FEATURES

(71) Applicant: UNITED TECHNOLOGIES CORPORATION, Hartford, CT (US)

(72) Inventors: John R. Otto, Middletown, CT (US); Sunil Sharma, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 545 days.

(21) Appl. No.: 13/653,548

(22) Filed: Oct. 17, 2012

(65) Prior Publication Data

US 2014/0196471 A1 Jul. 17, 2014

Related U.S. Application Data

(60) Provisional application No. 61/708,132, filed on Oct. 1, 2012.

(51) Int. Cl.
*F16H 1/28* (2006.01)
*F02C 7/36* (2006.01)

(52) U.S. Cl.
CPC .............. *F16H 1/2809* (2013.01); *F02C 7/36* (2013.01); *F05D 2260/30* (2013.01); *F05D 2260/40311* (2013.01); *Y02T 50/671* (2013.01); *Y10T 29/49231* (2015.01)

(58) Field of Classification Search
CPC ................................. F02C 7/36; F16H 1/2809
USPC .................... 60/796, 797, 798, 799, 801, 802, 60/39.163
See application file for complete search history.

(56) References Cited

U.S. PATENT DOCUMENTS

| 7,955,046 | B2 | 6/2011 | McCune et al. |
| 2007/0225111 | A1 | 9/2007 | Duong et al. |
| 2010/0105516 | A1 | 4/2010 | Sheridan et al. |
| 2011/0130246 | A1 | 6/2011 | McCune et al. |
| 2011/0286836 | A1 | 11/2011 | Davis |
| 2012/0220416 | A1 | 8/2012 | Janson et al. |
| 2012/0260669 | A1* | 10/2012 | Davis et al. ............... 60/797 |

FOREIGN PATENT DOCUMENTS

| EP | 2339146 A1 | 6/2011 |
| EP | 2270361 B1 | 6/2012 |

OTHER PUBLICATIONS

U.S. Appl. No. 13/407,916, filed Feb. 29, 2012, entitled "Gas Turbine Engine Front Center Body Architecture".
U.S. Appl. No. 13/484,878, filed May 31, 2012, entitled "Turbine Gear Assembly Support Having Symmetrical Removal Features".
International Search Report and Written Opinion of the International Searching Authority for International Application No. PCT/US2013/062092 mailed Jul. 2, 2014.
International Preliminary Report on Patentability for PCT Application No. PCT/US2013/062092, mailed Apr. 16, 2015.

* cited by examiner

*Primary Examiner* — Gerald L Sung
(74) *Attorney, Agent, or Firm* — Carlson, Gaskey & Olds, P.C.

(57) ABSTRACT

A disclosed gear assembly support for a gas turbine engine includes a first portion configured for attachment to a case of the gas turbine engine and a second portion configured for supporting a gear assembly. The support further includes a snap portion defining a fit within the case. The snap portion includes a tunable feature for adjusting a fit within the case. A torque reacting portion of the support transfers torque from the second portion to the first portion separate from the snap portion and include separately tunable features for adjusting the snap fit independent of the torque transfer portions.

12 Claims, 4 Drawing Sheets

FAN DRIVE GEAR SYSTEM FLEXIBLE SUPPORT FEATURES

REFERENCE TO RELATED APPLICATION

This application claims priority to U.S. Provisional Application No. 61/708,132 filed on Oct. 1, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The gear assembly is attached to a static structure through a flexible support. The flexible support orientates the gear assembly within the engine and also accommodates generated torque during operation. The support function includes a desired fit with static structure and is balanced against the torque transfer function. The configuration of the flexible support is therefore balanced against the desire to reduce cost and weight along with the separate functions. Accordingly, engine manufacturers continue to seek improvements in the support structure that balance the functional requirements against cost and weight.

SUMMARY

A gear assembly support for a gas turbine engine according to an exemplary embodiment of this disclosure, among other possible things includes a first portion configured for attachment to a case of the gas turbine engine, a second portion configured for supporting a gear assembly, and a snap portion defining a fit within the case. The snap portion includes a tunable feature for adjusting the fit within the case. A torque reacting portion transfers torque from the second portion to the first portion independent of the snap portion.

In a further embodiment of the foregoing gear assembly support, the snap portion includes an outer diameter defining the fit within the case and the tunable feature includes a thickness between an undercut and the outer diameter.

In a further embodiment of any of the foregoing gear assembly supports, the outer diameter includes a complete uninterrupted outer diameter and the undercut includes a plurality of undercuts spaced circumferentially apart proximate the outer diameter.

In a further embodiment of any of the foregoing gear assembly supports, the plurality of undercuts include an axial width and a radial width adjustable for tuning the fit within the case.

In a further embodiment of any of the foregoing gear assembly supports, the torque reacting portion includes a width between the tunable feature and an inner surface of the gear assembly support.

In a further embodiment of any of the foregoing gear assembly supports, includes a flex portion disposed between the second portion and the torque reacting portion.

In a further embodiment of any of the foregoing gear assembly supports, the snap portion includes an annular groove on a radially outer surface that fits within the case.

In a further embodiment of any of the foregoing gear assembly supports, the first portion include a plurality of flanges extending radially outward from the outer surface.

A gas turbine engine according to an exemplary embodiment of this disclosure, among other possible things includes a fan including a plurality of fan blades rotatable about an axis A, a compressor section, a combustor in fluid communication with the compressor section, a turbine section in fluid communication with the combustor, a geared architecture driven by the turbine section for rotating the fan about the axis A, and a support member that supports the geared architecture. The support member includes a first portion configured for attachment to a case. A second portion is configured for supporting the geared architecture. A snap portion includes a tunable feature for adjusting a fit within the case. A torque reacting portion transfers torque from the second portion to the first portion independent of the snap portion.

In a further embodiment of the foregoing gas turbine engine, the snap portion includes an outer diameter defining an interference fit with an inner diameter of the case and the tunable feature includes a thickness between an undercut and the outer diameter.

In a further embodiment of any of the gas turbine engines, the outer diameter includes a complete uninterrupted outer diameter and the undercut includes a plurality of undercuts spaced circumferentially apart proximate the outer diameter.

In a further embodiment of any of the gas turbine engines, the torque reacting portion includes an axial width.

In a further embodiment of any of the gas turbine engines, the snap portion includes an annular groove on a radially outer surface that fits within the case.

A method of supporting a gear assembly within a gas turbine engine according to an exemplary embodiment of this disclosure, among other possible things includes defining a fit between a support member and a static structure within the gas turbine engine with a snap portion, defining a torque transfer path between a first portion configured for attachment to the static structure and a second portion configured for attachment to the gear assembly independent of the snap portion, attaching the gear assembly to the second portion, and attaching the support member to the static structure such that the snap portion positions the support member relative to the static structure.

In a further embodiment of the foregoing method, defining the fit between the support member and the static structure includes defining a thickness between an outer diameter of the snap portion and an undercut proximate the outer diameter.

In a further embodiment of any of the methods, including defining a plurality of undercuts, spacing the plurality of undercuts circumferentially apart and defining the torque transfer path at least partially between the plurality of undercuts.

In a further embodiment of any of the methods, defining the torque transfer path includes defining an axial thickness of the torque transfer path.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
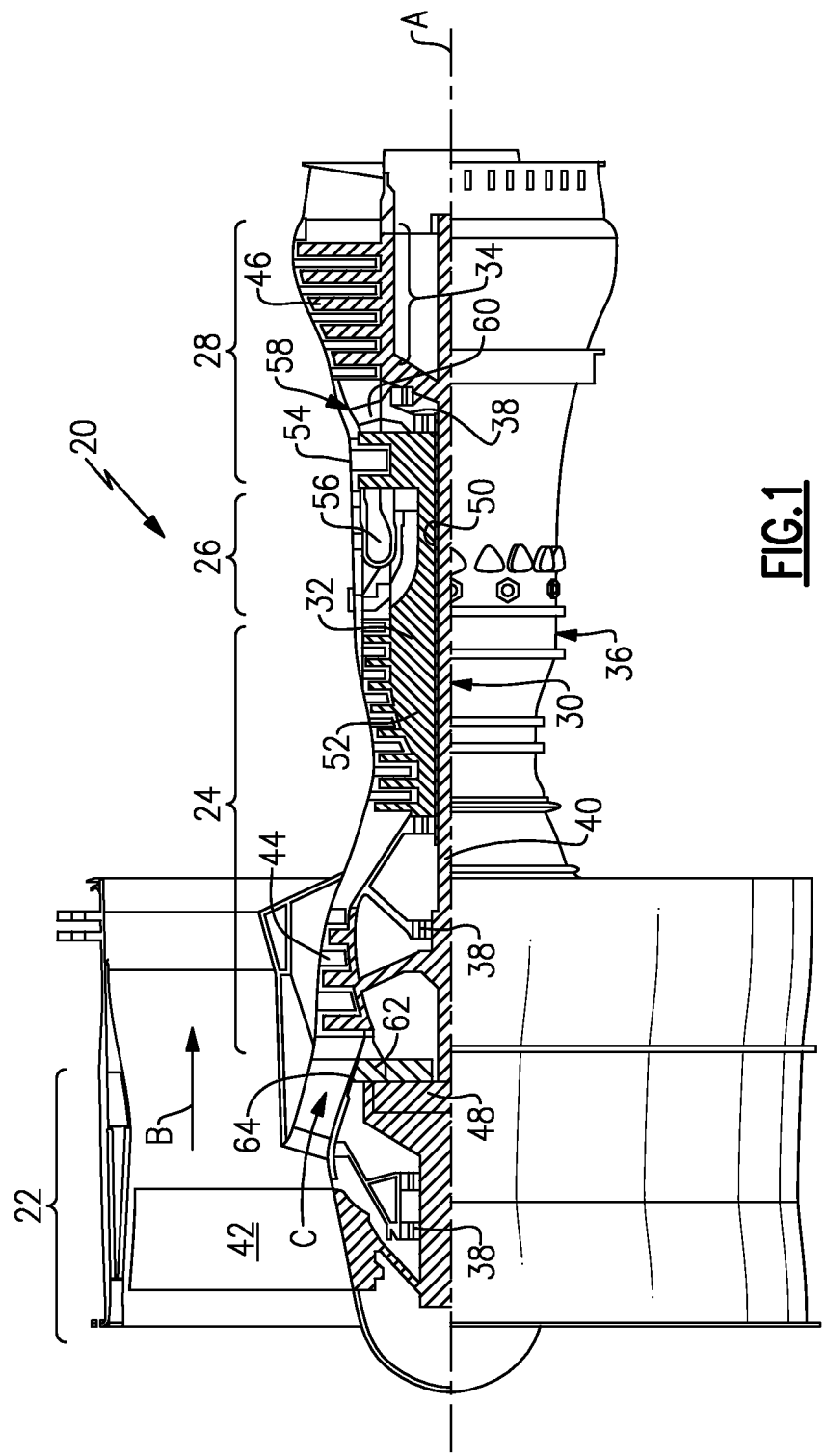
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$]. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A support member referred to in this disclosure as a flex support 62 is provided to mount the geared architecture 48 to a static structure or case 64 of the gas turbine engine 20. The flex support 62 supports the geared architecture 48 in a manner that provides flexibility to compensate for operational torque.

Figure 2:
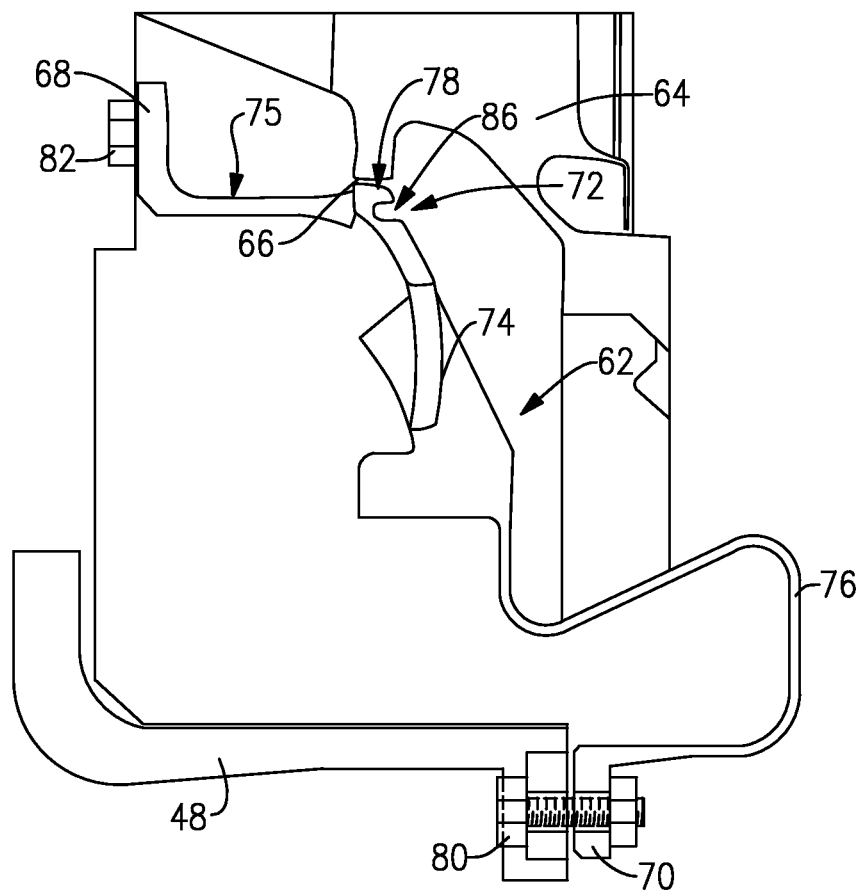
FIG. 2 is a sectional view of a portion of the gas turbine engine.

Referring to FIG. 2 with continued reference to FIG. 1, the example flex support 62 is fit within the case 64 including an inner diameter 66 that receives an outer diameter 78 of the flex support 62. The fit between the inner diameter 66 of the case 64 and the outer diameter 78 of the flex support 62 is an interference fit and provides for the orientation of the flex support 62 relative to the case 64. Accordingly, orientation of the flex support 62 relative to the case 64 will also provide an orientation of the geared architecture 48 relative to the fixed case structure 64.

The flex support 62 grounds torque generated by the geared architecture 48 to the fixed case structure 64. The flex support 62 includes a snap fit portion 72 that corresponds with the inner diameter 66 of the case 64. The snap fit portion 72 defines the interference fit between the case 64 and the flex support 62.

The flex support 62 further includes a torque reacting portion also referred to as a torque portion 74 and a flex portion 76. The flex portion 76, torque portion 74, and the snap fit portion 72 are disposed between a first attachment portion or flange 68 that attaches to the case 64 and a second attachment portion or flange 70 that attaches to the geared architecture 48. Fasteners 80 and 82 provide the connection between the flex support 62, the geared architecture 48, and the case 64. In addition to the fasteners 80 and 82, the interference fit defined between the case 64 and the snap fit portion 72 further orientates the flex support 62 within the gas turbine engine 20.

Figure 3:
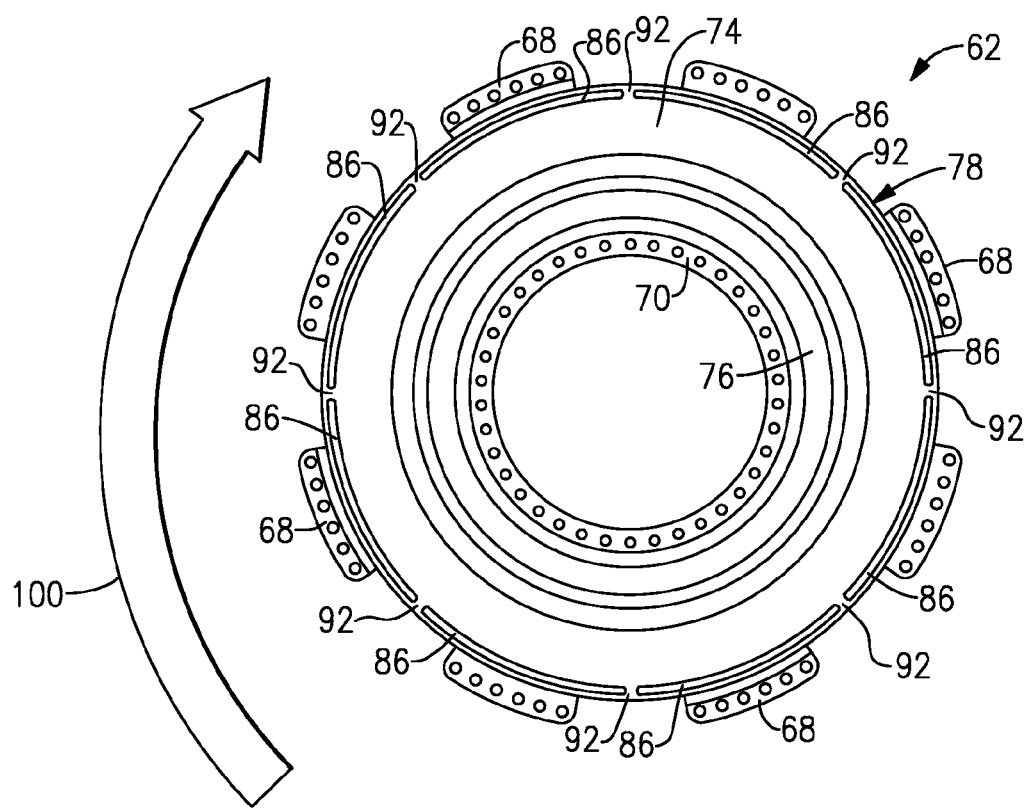
FIG. 3 is an aft view of an example flex support.

Referring to FIG. 3 with continued reference to FIG. 2, the flex support 62 grounds torque in a direction indicated by arrow 100 between the geared architecture 48 and the case 64. The torque encountered by the flex support 62 is communicated between the first flange 68 extending from a connecting portion 75 and the outer surface 78 from an inner flange 70 attached to the geared architecture 48. The connecting portion 75 corresponds with the location of each of the flanges 68. The connecting portion 75 is not a continuous surface about the flex support 62, but is located to extend between the snap fit portion 72 and the flange 68 in the location of each of the flange 68.

The flex support 62 provides the desired interference fit with the case 64 by providing the proper sized outer diameter 78 relative to the inner diameter 66 of the case 64. Torque 100 is transferred between the inner flange 70 to the outer flange 68. It should be understood, that the torque indicated by arrow 100 could be in an opposite direction and remain within the contemplation of this disclosure. In this example, the outer flange 68 is comprised of a plurality of separately disposed flanges 68 that are attachable by way of fasteners 82 to the case structure 64. The transmission of the torque 100 proceeds through the flex portion 76 and the torque portion 74 through the flanges 68 to be grounded to the case 64. The outer diameter 78 provides a snap fit to locate the flex support 62 within the case 64.

Torque is transferred through the torque portion 74 through the flanges 68 to be grounded to the case 64. It can be difficult to tailor material thicknesses to both provide the desired interference fit with the case 64 while also communicating and grounding torque generated by the gear assembly 48. The example flex support 62 separates the torque transmission path 74 from the snap fit feature 72 such that each of the snap fit feature 72 and the torque path 74 can be individually tailored and tuned to accommodate application specific requirements.

Figure 4:
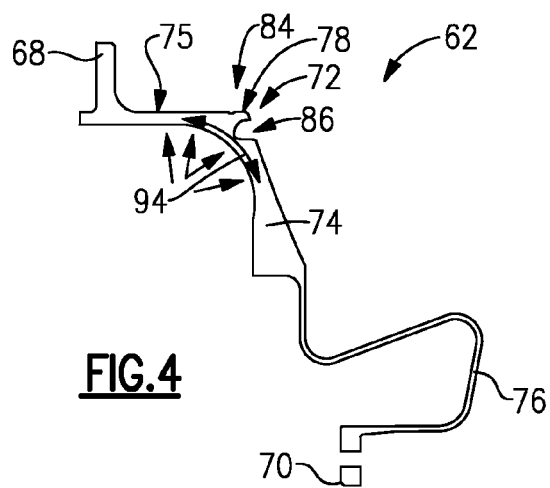
FIG. 4 is a cross-sectional view through a snap fit portion of the example flex support.
Figure 5:
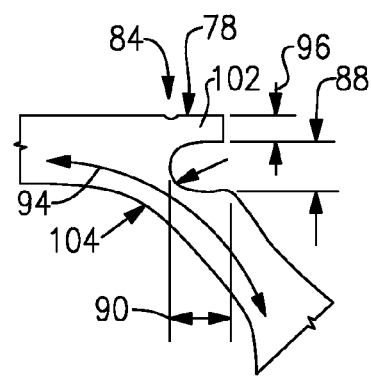
FIG. 5 is an enlarged view of an example undercut of the example flex support.
Figure 6:
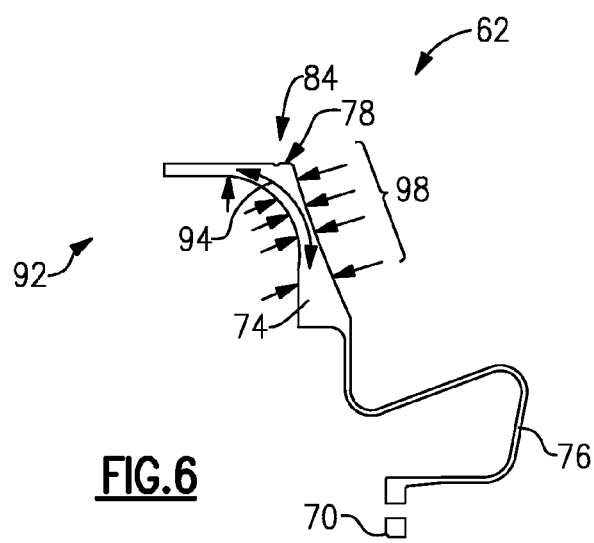
FIG. 6 is a cross-sectional view of a torque portion of the example flex support.

Referring to FIGS. 4, 5, and 6 with continued reference to FIG. 3, the example flex support 62 includes the snap portion 72 and an undercut 86. The undercut 86 is disposed proximate to the outer diameter 78 and aids in defining the snap fit load generated against the case 64. An annular groove 84 is disposed on the outer diameter 78 that fits within the case 64. The annular groove 84 extends continuously about the outer diameter 78 above a lip 102. The example outer diameter 78 is a complete uninterrupted surface that engages the case 64 to provide an interference fit aft of the connecting portions 75 that extend out to the flanges 68.

The undercuts 86 are disposed at specific circumferentially spaced apart intervals about the diameter of the flex support 62. Between the undercuts 86 are deformation limiting portions 92 that do not include the undercuts 86. The deformation limiting portions 92 include a thickness portion 98 (FIG. 6) that is different than a thickness portion 104 (FIG. 5) through the snap fit portions 72 defined by the undercuts 86. The thickness 104 is between the undercut 86 and an inner surface 105 of the flex support 62

The example flex support 62 transfers torque through a torque path indicated by arrows 94 under the undercuts 86. A thickness 104 through the torque path 94 under the undercuts 86 provides for the transmission of some torque through the snap fit portion 72. However, the undercuts 86 are spaced apart circumferentially about the flex support 62 such that the sizing of the thickness 98 through the deformation limiting portion 92 is different than the sizing of the thickness 104 through under the snap fit portion 72 to the flanges 68.

The thickness 104 is a full annulus of material and transfers torque through between flanges 70 and 68. The additional thickness provided in the deformation limiting portion 92 between the undercuts 86 limit radial deformation and additional stress induced by struts from the case 64 when reacting torque from the geared architecture. Accordingly, the entire thickness 104 around the flex support 62 transfers torque. The additional thickness show at 98 where no undercut 86 is present limits radial deflections from the struts of the case 64 more so than it contributes to the communication of torque between flanges 70 and 68.

In this example, the undercut 86 includes a radial width 88 and an axial width 90. The widths 88 and 90 are separately adjusted to generate a width 96 of the lip 102. The lip 102 defines the interference fit between the case 64 and the flex support 62. The lip 102 therefore defines a tunable feature that can be modified to define the fit of the flex support 62 within the case. The lip 102 includes the width 96 that is disposed at the circumferentially spaced apart undercuts 86 about the flex support 62. The widths 88 and 90 can be adjusted to generate the sizing of the thickness 102. The width 90 provides for the sizing of the sizing of the thickness 104 defined through the torque transmission portion 74.

Accordingly the example flex support 62 provides for the support of the gear assembly 48 and also for the adjustment of an interference fit with the case 64 that is independent of the torque path 94. The separation of the snap portion 72 and the torque portion 74 provides for the independent tailoring of material thicknesses through the flex support 62 to adjust the interference fit with the case 64 through adjustment of thickness of lip 102 and the torque transmission path 94 through adjustment of thickness 104 independent of each other. The independent adjustment allows for a lighter and more economically robust flex support 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gear assembly support for a gas turbine engine comprising:
   a first portion configured for attachment to a case of the gas turbine engine;
   a second portion configured for supporting a gear assembly;
   a snap portion defining a fit within the case, the snap portion including a tunable feature for adjusting the fit within the case, wherein the snap portion comprises an outer diameter defining the fit within the case and the tunable feature comprises a thickness between a plurality of undercuts and the outer diameter, the plurality of undercuts are circumferentially spaced apart; and
   a torque reacting portion for transferring torque from the second portion to the first portion independent of the snap portion, wherein the torque reacting portion is disposed between the plurality of circumferentially spaced undercuts and includes a thickness greater than the thickness between the outer diameter and the plurality of undercuts.

2. The gear assembly support as recited in claim 1, wherein the outer diameter comprises a complete uninterrupted outer diameter and the undercut comprises a plurality of undercuts spaced circumferentially apart proximate the outer diameter.

3. The gear assembly support as recited in claim 2, wherein the plurality of undercuts include an axial width and a radial width adjustable for tuning the fit within the case.

4. The gear assembly support as recited in claim 1, wherein the torque reacting portion includes a width between the tunable feature and an inner surface of the gear assembly support.

5. The gear assembly as recited in claim 1, including a flex portion disposed between the second portion and the torque reacting portion.

6. The gear assembly as recited in claim 1, wherein the snap portion includes an annular groove on a radially outer surface that fits within the case.

7. The gear assembly as recited in claim 6, wherein the first portion comprise a plurality of flanges extending radially outward from the radially outer surface.

8. A gas turbine engine comprising:
   a fan including a plurality of fan blades rotatable about an axis A;
   a compressor section;
   a combustor in fluid communication with the compressor section;
   a turbine section in fluid communication with the combustor;
   a geared architecture driven by the turbine section for rotating the fan about the axis A; and
   a support member that supports the geared architecture, the support member including a first portion configured for attachment to a case, a second portion configured for supporting the geared architecture, a snap portion including a tunable feature for adjusting a fit within the case, and a torque reacting portion for transferring torque from the second portion to the first portion independent of the snap portion, wherein the snap portion comprises an outer diameter defining the fit within the case and the tunable feature comprises a thickness between a plurality of undercuts and the outer diameter, the plurality of undercuts are circumferentially spaced apart; and the torque reacting portion is disposed between the plurality of circumferentially spaced undercuts and includes a thickness greater than the thickness between the outer diameter and the plurality of undercuts.

9. The gas turbine engine as recited in claim 8, wherein the torque reacting portion includes an axial width.

10. The gas turbine engine as recited in claim 8, wherein the snap portion includes an annular groove on a radially outer surface that fits within the case.

11. A method of supporting a gear assembly within a gas turbine engine comprising:
    defining a fit between a support member and a static structure within the gas turbine engine with a snap portion, wherein defining the fit between the support member and the static structure comprises defining a thickness between an outer diameter of the snap portion and a plurality of undercuts proximate an outer diameter of the support member, the plurality of undercuts spaced circumferentially apart;
    defining a torque transfer path between a first portion configured for attachment to the static structure and a second portion configured for attachment to the gear assembly independent of the snap portion, wherein the torque transfer path is disposed between the plurality of undercuts and includes a thickness greater than the thickness between the outer diameter and the plurality of undercuts;
    attaching the gear assembly to the second portion; and
    attaching the support member to the static structure such that the snap portion positions the support member relative to the static structure.

12. The method as recited in claim 11, wherein defining the torque transfer path comprises defining an axial thickness of the torque transfer path.

* * * * *